United States Patent
Montagne et al.

(10) Patent No.: US 10,737,606 B2
(45) Date of Patent: Aug. 11, 2020

(54) SLIDING PLATFORM LOADING DEVICE

(71) Applicant: ROLIDE, Tourcoing (FR)

(72) Inventors: Quentin Montagne, Bondues (FR); Julien Serrurier, Tourcoing (FR)

(73) Assignee: ROLIDE, Tourcoing (FR)

(*) Notice: Subject to any disclaimer, the term of this patent is extended or adjusted under 35 U.S.C. 154(b) by 130 days.

(21) Appl. No.: 15/821,252

(22) Filed: Nov. 22, 2017

(65) Prior Publication Data

US 2019/0152375 A1    May 23, 2019

(51) Int. Cl.
| | | |
|---|---|---|
| *B60P 1/43* | (2006.01) | |
| *B60P 1/00* | (2006.01) | |
| *B60R 13/01* | (2006.01) | |

(52) U.S. Cl.
CPC .............. *B60P 1/006* (2013.01); *B60P 1/003* (2013.01); *B60R 13/013* (2013.01)

(58) Field of Classification Search
CPC .......... B60P 1/6427; B60P 1/43; B60P 1/4442
See application file for complete search history.

(56) References Cited

U.S. PATENT DOCUMENTS 5,570,989 A * 11/1996 Belanger ................. B60P 1/431
                                                                        414/522
7,033,128 B2 * 4/2006 Poindexter ............... B60P 1/16
                                                                        414/522

* cited by examiner

*Primary Examiner* — Saul Rodriguez
*Assistant Examiner* — Willie Berry, Jr.
(74) *Attorney, Agent, or Firm* — Young & Thompson

(57) ABSTRACT

A sliding platform loading device intended to equip the rear area of a vehicle that has protruding wheel passages includes: a fixed chassis, intended to be anchored onto the rear loading area of the vehicle; the sliding platform; and a guiding system between the sliding platform and the fixed chassis. The sliding platform is able to pass from a retracted position on the fixed chassis, to an unfolded position on the cantilever of the fixed chassis. The device includes auxiliary platforms, fixed, held by the fixed chassis, on the same level as the flat area of the sliding platform, the auxiliary platforms defining two lateral indentations, intended to be of an additional form to the wheel passages, and in that in the retracted position from the sliding platform, the auxiliary platforms laterally extend the flat area of the sliding platform.

19 Claims, 8 Drawing Sheets

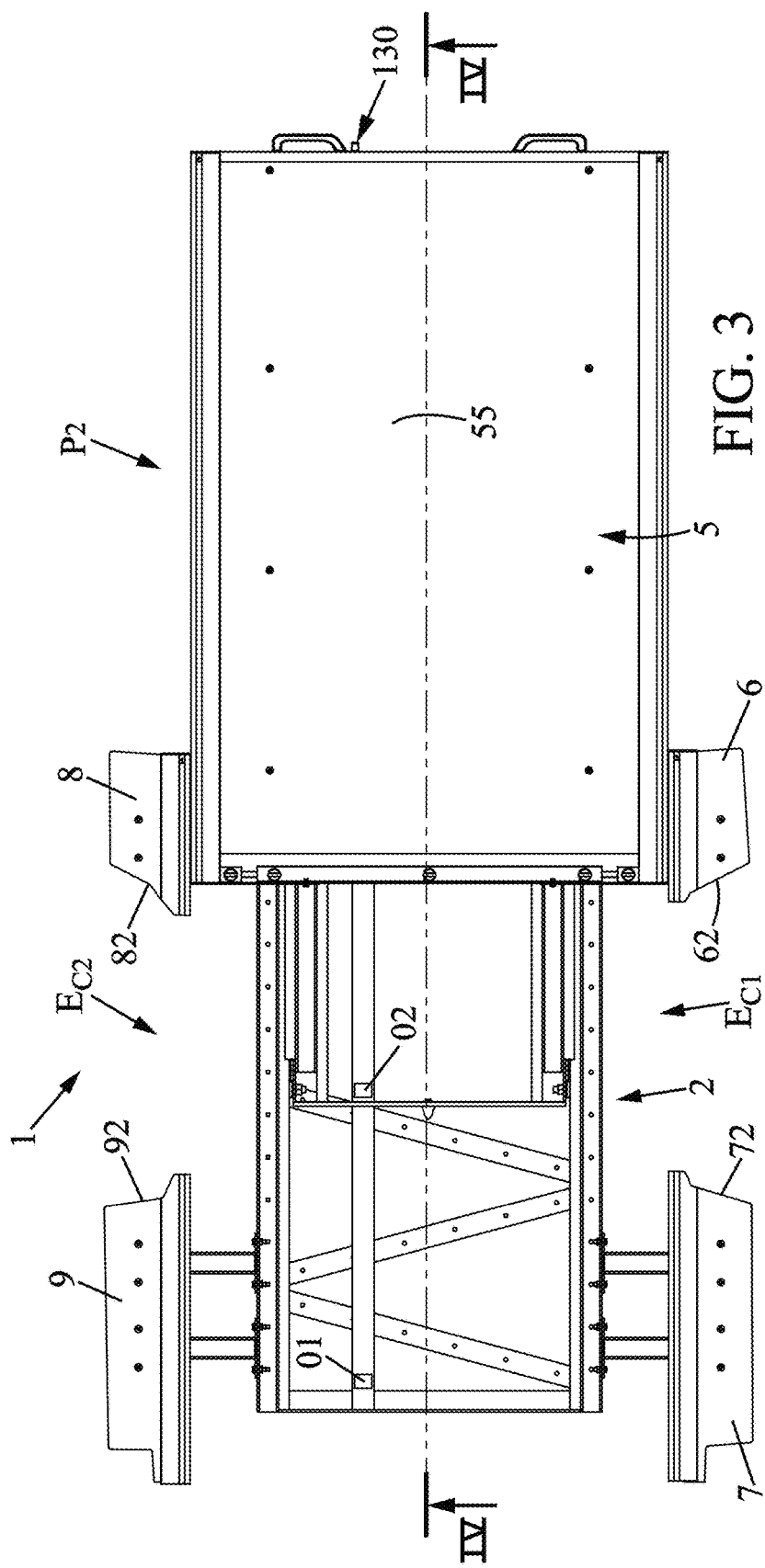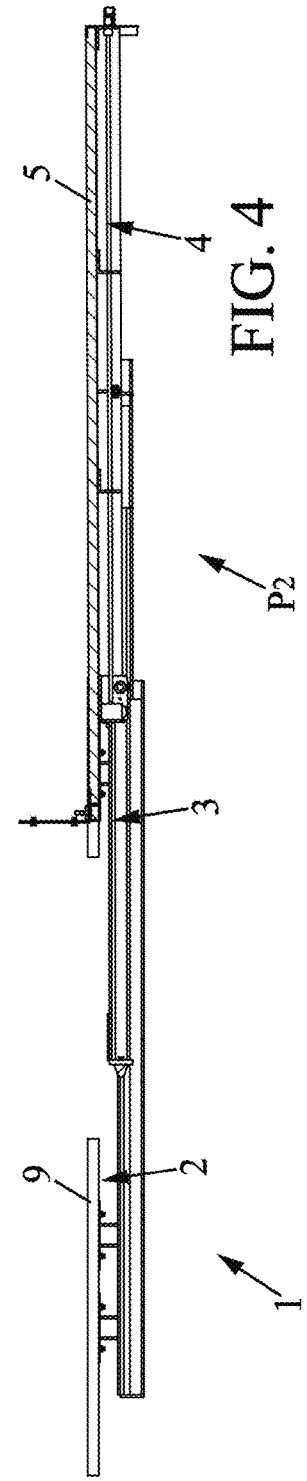

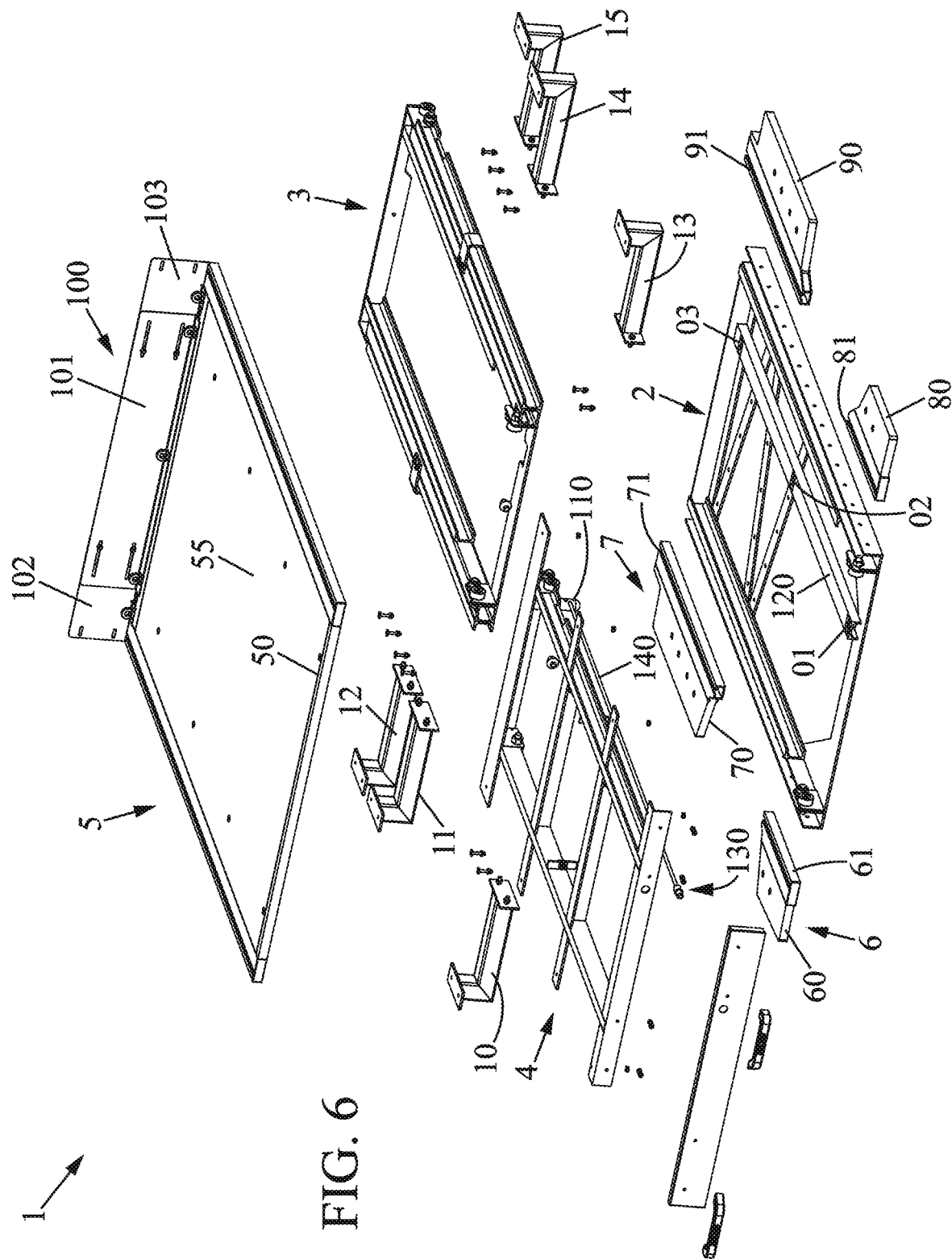

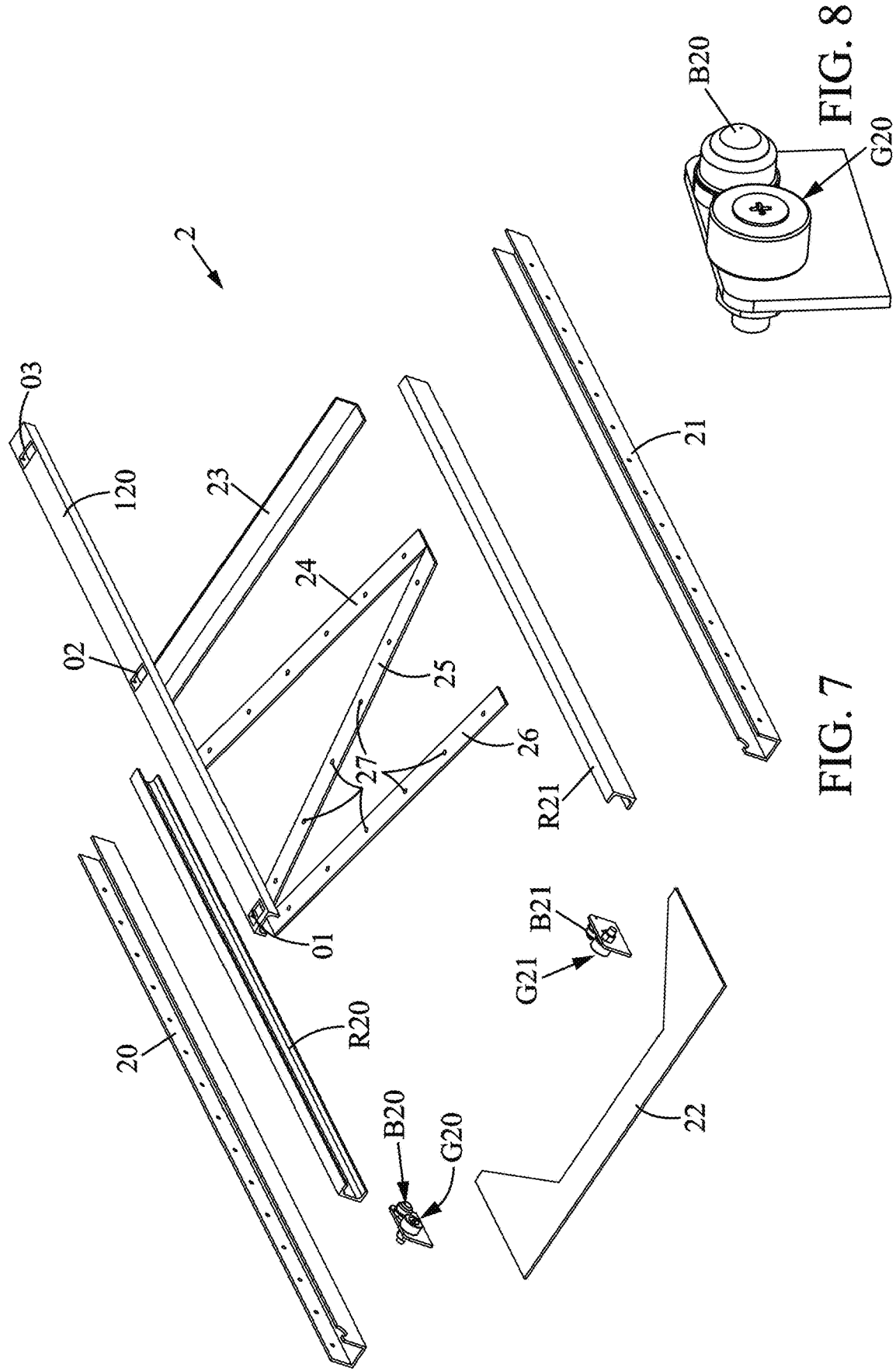

SLIDING PLATFORM LOADING DEVICE

BACKGROUND OF THE INVENTION

Field of the Invention

The invention relates to a sliding platform device for assisting with loading/unloading, as well as a method for producing such a loading/unloading device.

The field of the invention is that of utility vehicles, in particular, light-duty vehicles, in particular, the pick-up truck type, and more specifically, sliding platform devices used to facilitate the loading/unloading of the rear loading area of the vehicle.

Description of the Related Art

Such devices are today commercialised, in particular under the brand Bedslide®, or the brand Cargo Glide®.

Such a sliding platform loading device known from the state of the art comprises:
- a fixed chassis, intended to be anchored on the rear loading area of the vehicle, for example, to the interior area of the tipper of a pick-up truck,
- a first mobile chassis, sliding in relation to the fixed chassis by the intermediary of a first sliding system between the fixed chassis and the first mobile chassis,
- a second mobile chassis, sliding in relation to the first mobile chassis by the intermediary of a second sliding system between the fixed chassis and the second mobile chassis,
- the sliding platform, firmly connected to the second mobile chassis.

In the retracted position from the sliding platform, the latter can be fully entered into the confines of the rear loading area of the vehicle, enabling to close the hatch of the tipper of the vehicle.

Once the hatch of the vehicle is in the open position, the platform can be manually pulling by sliding the rear cantilever of the vehicle until the first sliding system and the second sliding system come to a stop.

In this unfolded position, the platform largely facilitates the loading (or the unloading), by enabling the operator an easy access to the rear cantilever sliding platform, without needing for the latter to enter and/or be leaned into the vehicle for these operations.

Today, the devices commercialised can be compatible with a certain number of light-duty vehicles, and be added to an existing vehicle.

However, and according to the observations of the inventors, the sliding platform is necessarily of a lesser width than the gap between the wheel passages, in that these wheel passages laterally protrude from the two sides of the rear area of the vehicle.

The sliding platform devices from the state of the art thus have the disadvantage of offering, in the retracted position from the sliding platform, a non-flat loading area, because of the presence of lateral zones on the rear area of the vehicle, located above and below each wheel passage, on both sides of the sliding platform, not covered by the sliding platform.

These lateral zones form extra deep cavities in the sliding platform, where small objects and/or dirt can accumulate, which, because of their low level of accessibility, damage the cleanability of the vehicle, and increase the risk of losing small objects that are transported.

SUMMARY OF THE INVENTION

The aim of the present invention is to alleviate the disadvantages stated above, by proposing a sliding platform device which can equip the rear area of a vehicle that has protruding wheel passages, advantageously without damaging the rear loading area, and without increasing the risk of losing objects.

Other aims and advantages will appear during the description which will follow, which is only given as an example and which does not aim to limit it.

Also, the invention relates to a sliding platform loading device, intended to equip the rear area of a vehicle that has protruding wheel passages, comprising:
- a fixed chassis, intended to be anchored onto the rear loading area of the vehicle,
- the sliding platform,
- a guiding system between the sliding platform and said fixed chassis, said sliding platform being able to pass from a retracted position on the fixed chassis, to an unfolded position on the cantilever of said fixed chassis.

According to the invention, the device comprises auxiliary platforms, fixed, held by the fixed chassis, on the same level as the flat area of the sliding platform, said auxiliary platforms defining two lateral indentations, intended to be of an additional form to said wheel passages, and in that in said retracted position from the sliding platform, the auxiliary platforms laterally extend the flat area of the sliding platform.

According to an embodiment, said guiding system between the sliding platform and said fixed chassis comprises:
- a first mobile chassis, sliding in relation to the fixed chassis by the intermediary of a first sliding system between the fixed chassis and the first mobile chassis,
- a second mobile chassis, sliding in relation to the first mobile chassis by the intermediary of a second sliding system between the fixed chassis and the second mobile chassis, and wherein said sliding platform is firmly connected to the second mobile chassis.

According to the optional characteristics of the invention taken alone or in combination:
- the fixed chassis comprises a frame formed by two side members and two crossbars connected by their ends, and wherein the supports extend laterally from the side members to the exterior of the frame, in order to hold the auxiliary platforms on the cantilevers to the side members;
- each support connecting one of the side members to the corresponding auxiliary platform comprises a bracket formed by two tubular profiles, perpendicular, put end-to-end by their end, said bracket having, at one of the free ends thereof, a plate attached to the lateral area of a side member, and at the other free end thereof, a plate attached to the underside of the auxiliary platform;
- the fixed chassis has several anchor irons spread out over the top of the frame, each one of the anchor irons connecting two side members along a direction by means in relation to the crossbars, not perpendicular to the side members;
- each one of the anchor irons comprises a plurality of bores being intended for the adjustment of the position of attachment bodies, ensuring the attachment of said fixed chassis to the vehicle;
- the sliding platform comprises a plate, as well as peripheral protective profiles, bordering the plate at least along the lateral edges thereof, even along the rear edge thereof and the front edge thereof;

the auxiliary platforms each comprise a plate, as well as a protective profile bordering the interior edge of said plate, intended to be in the immediate proximity of the sliding platform in said retracted position;

the or at least part of the protective profiles of the auxiliary platform and/or the or each protective profile of the sliding platform comprises a U-shaped section, receiving the edge of the plate at the interlocking unit, extended by a tubular section, in the function of a hanging groove, of the same thickness, having a higher, longitudinal slot leading from the upper wall of the tubular section, forming the groove inlet;

the upper area of the edge of the plate is machined with a thickness corresponding to the thickness of the upper wing of the profile covering the upper area of the plate, and wherein said machined part of the plate receive the upper wing of the protective, covered profile at the interlocking unit, said upper area of the protective profile being flush with the non-machined, upper area of said plate, adjoining said protective profile.

According to an embodiment, the first sliding system between the fixed chassis and the first mobile chassis, comprises:

first rails of said fixed chassis and the first rollers of said first mobile chassis intended to cooperate at the bearing with said first rails, second rails of the first mobile chassis and the second rollers of the fixed chassis intended to cooperate at the bearing with said second rails.

According to an embodiment, the second sliding system between the first mobile chassis and the second mobile chassis comprises:

first rails of said first mobile chassis and the first rollers of said second mobile chassis intended to cooperate at the bearing with said first rails, second rails of the second mobile chassis and the second rollers of said first mobile chassis intended to cooperate at the bearing with said second rails.

According to an embodiment, the first sliding system and/or said second sliding system has:

rollers, in particular, said first rollers and second rollers, at the horizontal rotating axis, intended to hold the load, intended to each cooperate at the bearing with a horizontal wing of a rail, ball bearing systems oriented so as to each cooperate at the bearing with a vertical wing of a rail, in order to ensure lateral guiding.

According to an embodiment, the device has, at the rear of the sliding platform, a protruding rail system, intended to ensure that objects that are on the sliding platform are held.

Said rail system can be of an adjusted length, along the width direction of the platform, comprising:

a central part and two lateral parts, separate, respectively extending along the length of said central part to these two ends, adjustment means, enabling to ensure the attachment of the lateral parts in different positions over the length of the central part.

In particular, the central part and the lateral parts are in the form of vertical panels, the adjustment means comprising oblong openings oriented along the length of the panels and along the adjustment direction, intended to be crossed by attachment bodies, such as bolts.

According to an embodiment, the device can have a sliding plate locking system, at least in said retracted position and/or in said unfolded position from the sliding platform, or even in an intermediary position, comprising:

a mobile body, connected to the second mobile chassis, protruding in the direction of the fixed chassis and a corresponding blocking body, connected to the fixed chassis, said locking body being able to pass from a state of insertion, wherein the body enters at least one opening of the blocking body, to a retracted state, wherein the mobile body escapes said opening, a moving device, arranged at the level of the front edge of the sliding platform, a mechanical transmission, such as a rail, connecting said moving device to said mobile body and ensuring the passage of the locking body in a state of insertion, to the retracted state, at the time of an action on the moving device.

The moving device can comprise a pushbutton, arranged on a handle firmly connected to the second mobile chassis.

According to an embodiment:

the blocking body can comprise a profile, oriented along the length of said fixed chassis and having several blocking openings for the mobile body;

said mobile body can be moved along the direction of the blocking body under the stress of a spring, a manual action on the moving device, stressing the mobile body to the retracted state thereof.

According to an embodiment, the device can enable an unfolding of at least 80% of the length of the sliding platform on the cantilever of said fixed chassis in said unfolded position.

The invention again relates to an automotive vehicle comprising a rear loading area that has two protruding wheel passages, said rear area of the vehicle being equipped with a sliding platform loading device according to the invention, of which the lateral indentations receive said wheel passages at the adjustment unit, and such that in said retracted position from the sliding platform, the loading device forms a flat area over the whole width of the rear area of said vehicle.

The invention again relates to a method for producing a sliding platform loading device according to the invention, intended to equip a vehicle comprising a rear loading area that has two protruding wheel passages, said method having the following steps:

obtaining dimensions of the rear area of the vehicle, sizing the auxiliary platforms such that, in said retracted position from the sliding platform, the assembly of the area of the mobile platform and the area of the auxiliary platforms forms a flat, continuous area over the whole width of the rear area of said vehicle.

BRIEF DESCRIPTION OF THE DRAWINGS

The invention will be best understood upon reading the following description, supported by the appended drawings, amongst which:

FIG. 3 is a top view of a loading device in said unfolded position from the sliding platform, FIG. 4 is a view according to the cross-section Iv-Iv, such as illustrated in FIG. 3, FIG. 6 is an exploded view of the device in FIG. 1, FIG. 7 is an exploded view of said fixed chassis of the device in FIG. 1, FIG. 8 is a detailed view of a unit comprising a roller, intended to cooperate at the bearing with the horizontal wing of a guiding rail, to enable the load to be held, as well as a ball bearing intended to cooperate with the guiding rail wing to ensure the lateral guiding of the sliding platform.

DESCRIPTION OF THE PREFERRED EMBODIMENTS

Figure 1:
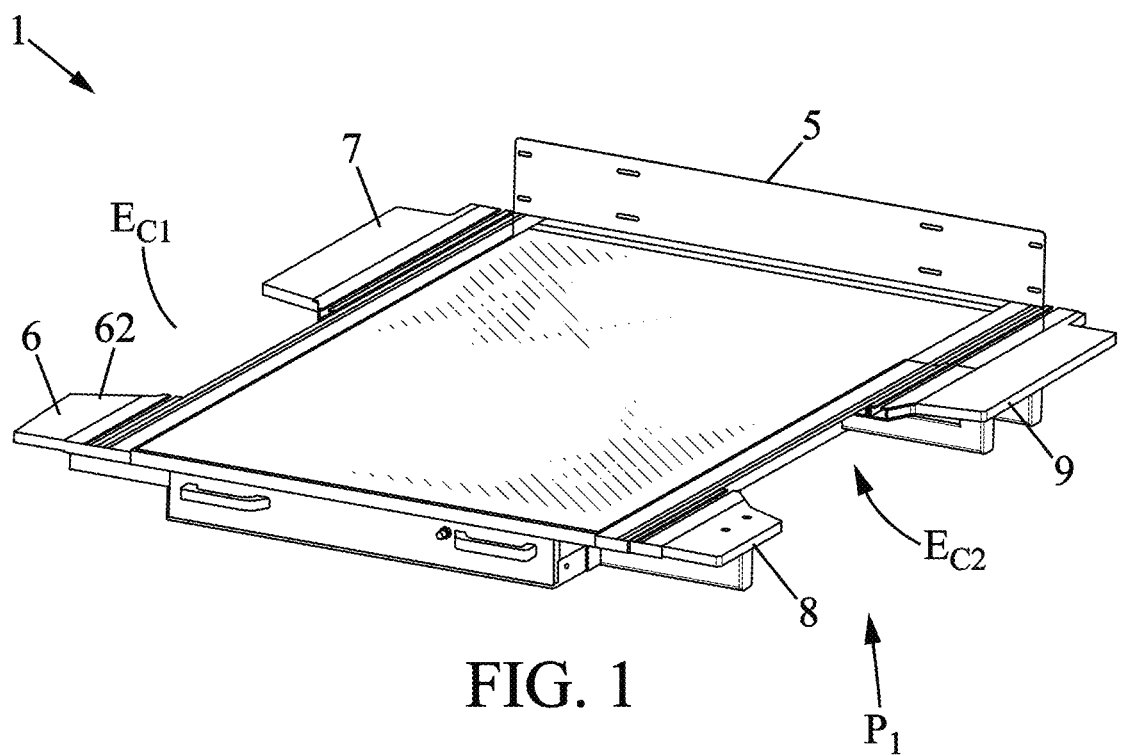
FIG. 1 is a perspective view of a loading device that conforms with the invention according to an embodiment, in said retracted position from said sliding platform.
Figure 2:
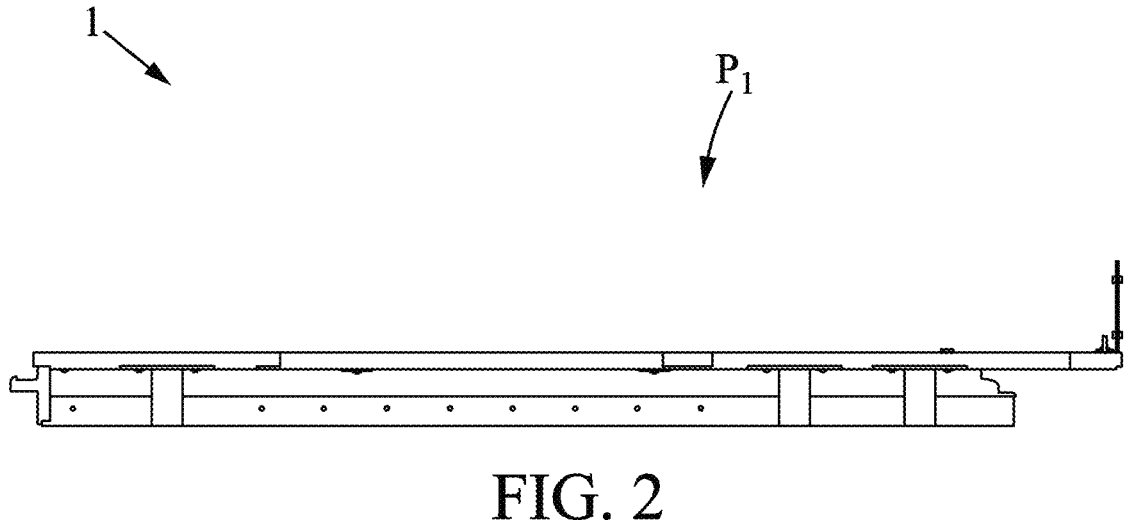
FIG. 2 is a side view of the device, such as illustrated in FIG. 1.
Figure 5:
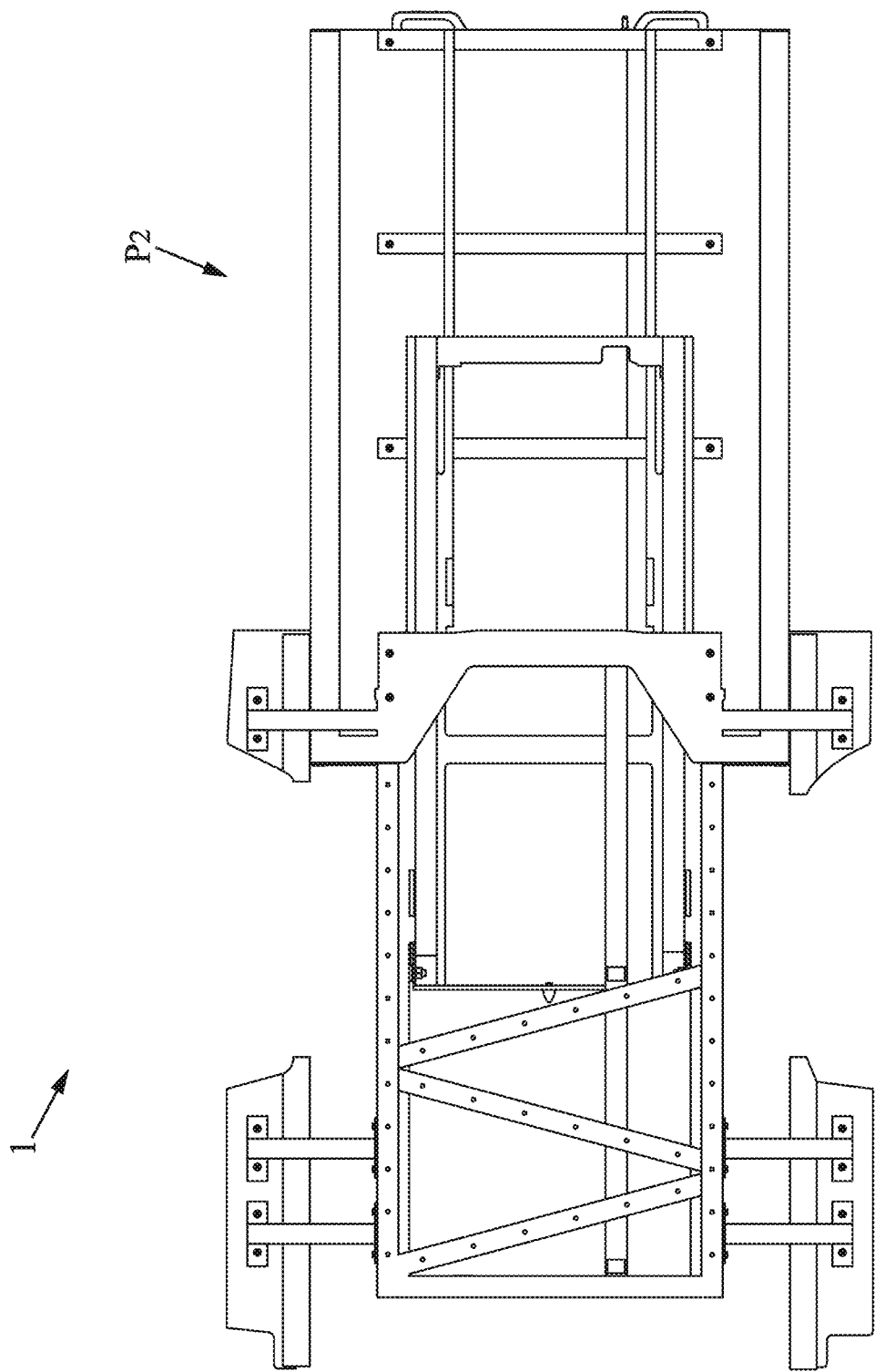
FIG. 5 is a bottom view of FIG. 3.
Figure 9:
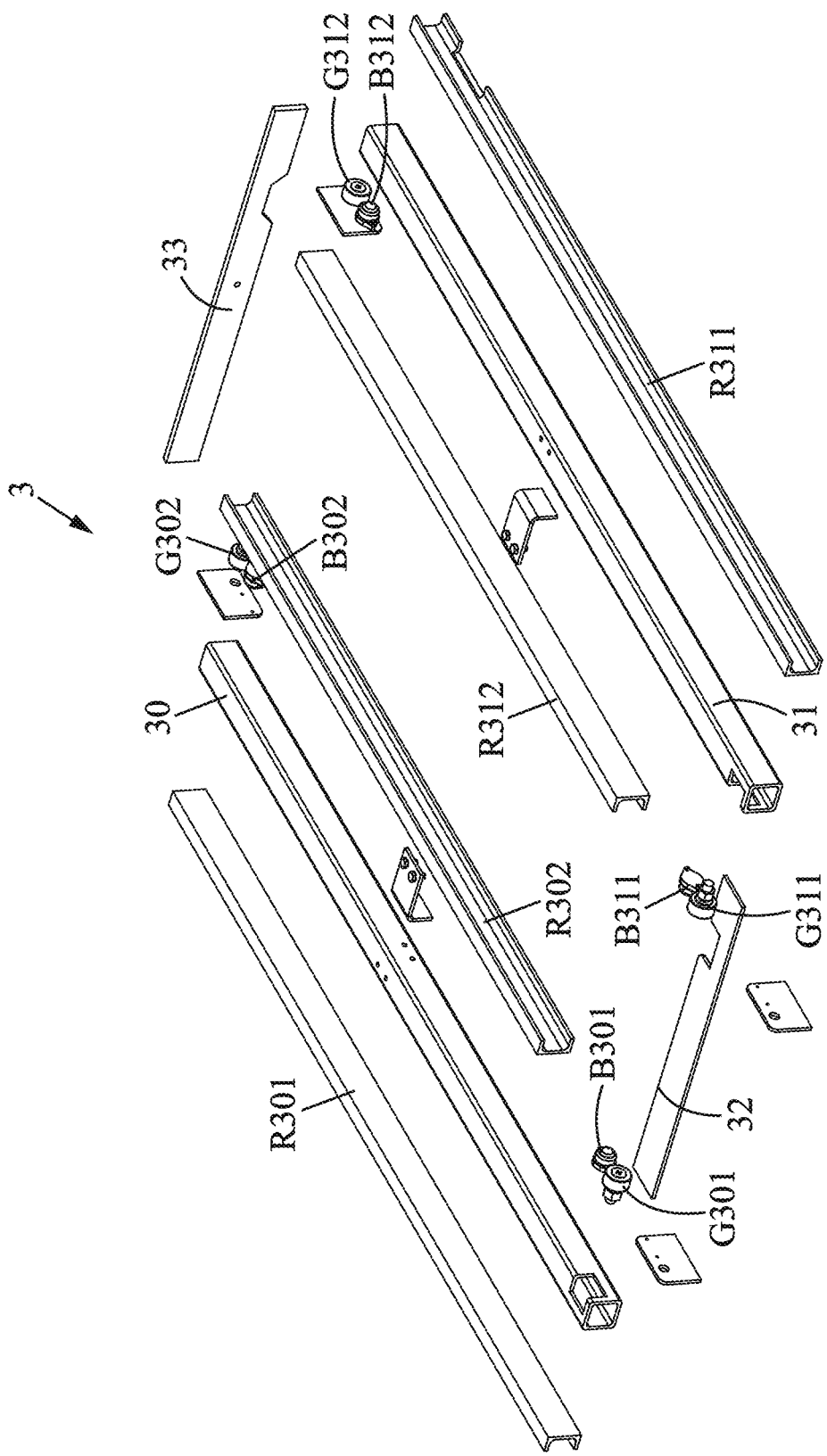
FIG. 9 is an exploded view of said first mobile chassis of the device in FIG. 1.
Figure 10:
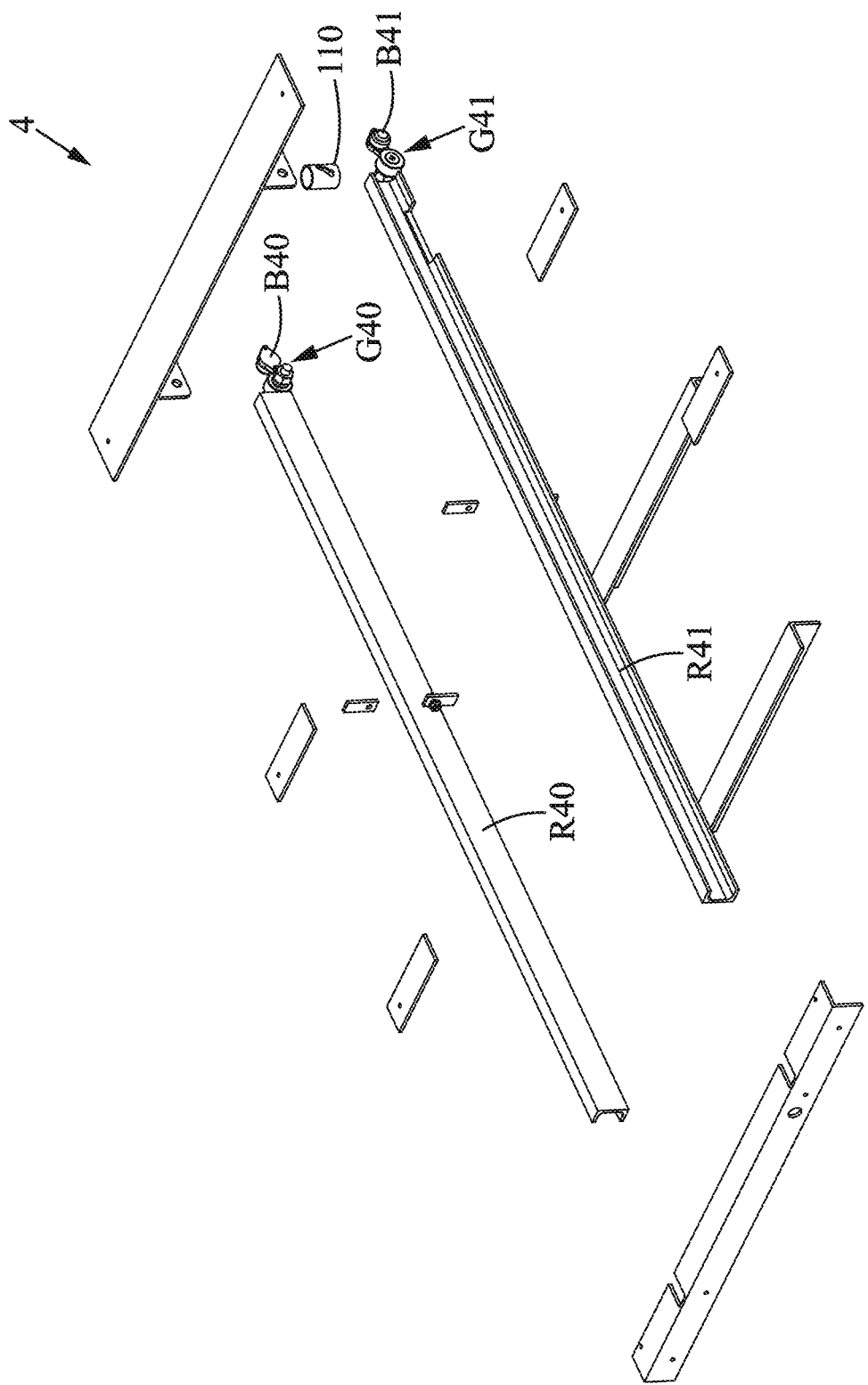
FIG. 10 is an exploded view of the second mobile chassis of the device in FIG. 1.

Also, the invention relates to a sliding platform loading device 1, intended to equip the rear area of a vehicle that has protruding wheel passages.

Such a platform finds a specific application for equipping the rear area of vehicles, in particular, light-duty vehicles, such as the area of the tipper of a pick-up truck type vehicle.

Such a device 1 comprises:
- a fixed chassis 2, intended to be anchored on the rear loading area of the vehicle,
- the sliding platform 5,
- a guiding system (sliding) between the sliding platform 5 and said fixed chassis, and along a sliding direction.

The sliding platform 5 can pass from a retracted position P1 on the fixed chassis 2, to an unfolded position P2 on the cantilever of said fixed chassis 2.

Said guiding system between the sliding platform 5 and said fixed chassis 2 can comprise:
- a first mobile chassis 3, sliding in relation to the fixed chassis by the intermediary of a first sliding system between the fixed chassis and the first mobile chassis,
- a second mobile chassis 4, sliding in relation to the first mobile chassis by the intermediary of a second sliding system between the fixed chassis and the second mobile chassis, said sliding platform 5 being firmly connected to the second mobile chassis 4.

During the actuation of the sliding platform 5 from the retracted position thereof to the unfolded position thereof (or vice versa), the first mobile chassis 3 slides on the fixed chassis 2, and said second mobile chassis 4 slides along said first mobile chassis 3, along one same direction.

The movement path of the platform is limited by stoppers at the end of the path between the three elements thereof (fixed chassis, first mobile chassis and second mobile chassis) and along the two unfolding directions, during unfolding and during retraction.

According to the invention, the device 1 comprises fixed auxiliary platforms 6, 7, 8, 9, held by the fixed chassis 2, on the same level as the flat area of the sliding platform 5.

Advantageously, these auxiliary platforms 6 to 9 define two lateral indentations Ec1, Ec2 intended to be of an additional form to said wheel passages.

In said retracted position P1 from the sliding platform 5, the auxiliary platforms 6, 7, 8, 9 laterally extend the flat area of the sliding platform 5.

According to an embodiment (illustrated as an example), one of the identified lateral indentations E1 is defined by an interspace between two separate, auxiliary platforms, referenced 6 and 7, mutually spaced out, the other lateral indentation, referenced E2, being defined by an interspace between two other separate, auxiliary platforms, referenced 8 and 9, arranged on the other side of the sliding platform.

Advantageously, the lateral indentations Ec1, Ec2 receive, at the adjustment unit nearby, respectively said two wheel passages and such that in said retracted position from the sliding platform 5, the loading device forms a flat area (constituted by the assembly of the support area of the sliding platform and the support area of the auxiliary platforms), over the whole width of the rear area of said vehicle.

The invention again relates to such a vehicle equipped with such a sliding platform loading device.

The loading device according to the invention advantageously enables to remove lateral cavities formed between the lateral walls of the rear area of the vehicle and the sliding platform, and such that they are encountered in the state of the art stated in the introduction.

Such a loading device can equip the rear area of a vehicle, in particular, a utility vehicle such as a pick-up truck, during the production of the vehicle, or again, as being added after the production thereof as an accessory.

The invention thus again relates to a method for producing a sliding platform loading device according to the invention, intended to equip a vehicle comprising a rear loading area that has two protruding wheel passages, said method having the following steps:
- obtaining dimensions of the rear area of the vehicle, these sizes being defined between the lateral walls, including the lateral walls formed by the wheel passages,
- sizing the auxiliary platforms 6 to 9 such that, in said retracted position from the sliding platform, the assembly of the area of the mobile platform and the area of the auxiliary platforms forms a flat, continuous area over the whole width of the rear area of said vehicle, even preferably over the whole length of the rear loading area.

Here, the size separating the lateral walls from the rear (loading) area of the vehicle means the width size of the rear area of the vehicle, and the length size, this means the size of the rear area along the longitudinal axis of the vehicle.

According to an embodiment, the fixed chassis 2 can comprise a frame formed by two side members 20, 21 and two crossbars 22, 23 connected by their ends. The holding of the auxiliary platforms can be obtained by supports 10 to 15, laterally extending from the side members 20, 21 to the exterior of the frame, in order to hold the auxiliary platforms 6, 7, 8, 9 on the cantilever of the side members 20, 21. The positions of the supports 10 to 15 are such, that the latter do not block the interspaces defined at the level of the indentations Ec1, Ec2, in that these interspaces are intended to receive the wheel passages of the vehicle.

FIG. 6 illustrates, as a non-exhaustive example, these supports 10 to 15. Each support 10; 11; 12; 13; 14; 15 connects one of the side members 20, 21 to the corresponding auxiliary platform 6; 7; 8; 9. Each support can comprise a bracket formed by two tubular profiles, perpendicular, put end-to-end by their end. For example, and according to the example illustrated, the two tubular, rectangular section profiles, have two bevelled ends, in particular cut at 45°, put end-to-end, and connected by an external soldering. Said bracket, again having at one of the free ends thereof, a plate attached to the lateral area of a side member, and at the other free end thereof, a plate attached to the underside of the auxiliary platform. The plate attached to the side member and the plate attached to the auxiliary plate can each have openings for the passage of attachment bodies, such as bolts. The first profile of each support 10 to 15 can extend at a right angle from the side members, along the direction of the crossbars, to the exterior of the frame, and the second profile, vertical, to the top.

According to an embodiment, the fixed chassis 2 can have one or preferably several anchor irons 24, 25, 26, said irons being spread out over the top of the frame: the or each one of the anchor irons connects the two side members 20, 21 along a direction by means in relation to the crossbars 22, 23, not perpendicular to the side members 20, 21. The or each one of the anchor irons 24, 25, 26 preferably comprises a plurality of bores 27 spread out over the length of the iron, said bores 27 being intended for the adjustment of the position of attachment bodies ensuring the attachment of said fixed chassis to the vehicle.

The function of the anchor iron(s) is/are that of attachment and anchoring the fixed chassis on the rear area of the vehicle, and more specifically, to propose a set of attachment points and so as to enable the anchoring of the device over the greatest number of vehicles in the market. In other words, the anchor iron(s) respond(s) to the universal problem of attaching the device to vehicles in the market.

The number and orientation by means of anchor irons respond to this objective by offering adjustment of the position of the anchor point(s), not only over the width of the vehicle, but also along the length direction. During the anchoring of the fixed chassis to the rear area of the vehicle, the installer selects the anchoring point(s) on the irons, positions it/them in the most suitable way to the attachment of the fixed chassis on the vehicle. The number of anchor irons can be between two and four, such as three or four.

According to an embodiment, the sliding platform 5 can comprise a plate 50, as well as peripheral protective profiles 51 to 54, bordering the plate at least along the lateral edges thereof, or even the rear edge thereof and the front edge thereof.

The plate 50 can be wood-based, such as a solid wood panel, or a plywood panel. The wood-based panel can be covered with a protective coating 55, impermeable, even preferably non-slip. The protective profiles, made of metal, have the function of protecting the edges of the panel, even stiffening the sliding platform, and in order to increase the load resistance thereof. The plate 50 can be substantially rectangular, and the protective profiles can form a frame protecting the four edges of the plate 50.

According to an embodiment, the auxiliary platforms 6 to 9 can each comprise a plate 60; 70; 80; 90, as well as a protective profile 61; 71; 81; 91. This protective profile 61; 71; 81; 91 borders the interior edge of said plate 60; 70; 80; 90: this profile is intended to be in the immediate proximity to the sliding platform 5 in said retracted position P1.

Advantageously, the or at least part of the protective profiles 61; 71; 81; 91 of the auxiliary platform and/of the or at least part of the protective profiles 51; 52; 53 of the sliding platform 5 can comprise a U-shaped section 16, receiving the edge of the plate at the interlocking unit, extended by a tubular section 17, in the function of a hanging groove, of the same thickness as the U-shaped section.

Further to the protective element function thereof, even stiffening, the or these profiles can have an additional function of a hanging groove for assembling accessories on the platform, such as assembling lateral walls, bike holders or other accessories coming to be attached in the hanging groove(s).

Figures 11, 12:
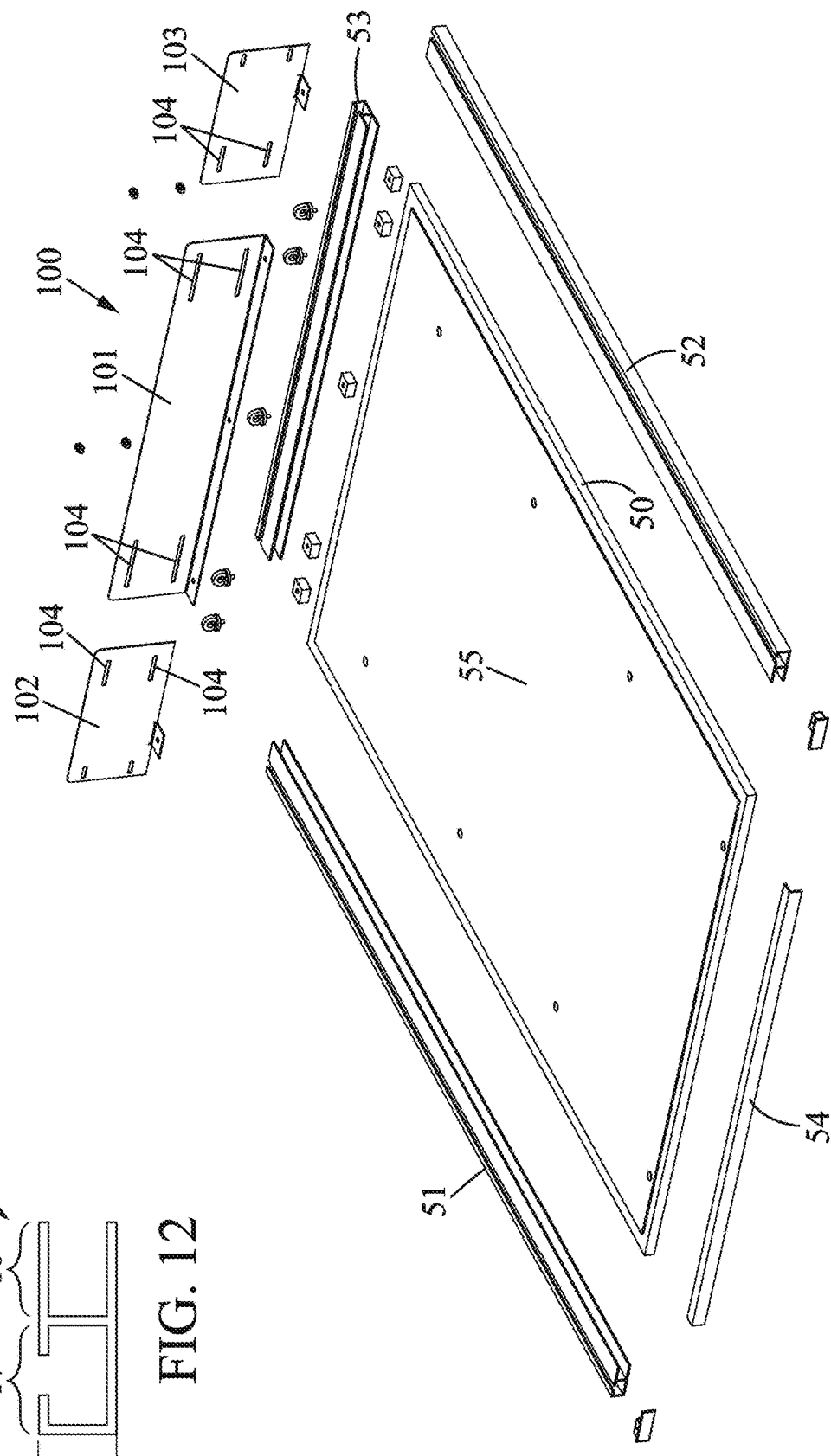
FIG. 11 is an exploded view of the sliding platform of the loading device in FIG. 1.
FIG. 12 is a cross section view of protective profile of the sliding platform of FIG. 11.

Such a profile is illustrated as a non-exhaustive example in FIG. 12. It has a U-shaped section of a size adjusted to the size of the plate thickness, so as to receive said plate: the thickness size ep, namely the size separating the two U-shaped wings, is adjusted to the thickness size of the plate: once interlocked, the edge of the plate stops against the U-shaped connecting wing, the U-shaped lateral wings extending above and below the panel.

The tubular section referenced 17 is substantially of the same thickness ep. This tubular section has an upper, longitudinal slot leading from the upper wall of the tubular section. This slot forms the inlet of the hanging groove. The inlet of the groove is smaller than the width of the groove.

According to an embodiment (illustrated in FIG. 11), the upper area of the edge of the plate 50; 60; 70; 80; 90 can be machined with a thickness corresponding to the thickness of the upper wing of the profile 51; 52; 53; 54; 61; 71; 81; 91 covering the upper area of the plate. Advantageously, said machined part of the plate receives the upper wing of the profile at the interlocking unit, covering said upper area of the profile thus being flush with the upper, non-machined area of said plate, adjoining said profile.

Thus, and advantageously, the area of the platform is perfectly flat, and in particular, with no difference in level between the upper sealing zone between each protective profile and the plate bordered by the profile: the flat area of the device in the retracted position from the platform has no irregularity, whereon an operator is likely to stop when an operator works above.

According to an embodiment, the first sliding system between the fixed chassis and the first mobile chassis, comprises:

first rails R20, R21 of said fixed chassis 2 and first rollers G301, G311 of said first mobile chassis 3 intended to cooperate at the bearing with said first rails R20, R21, second rails R301, R311 of first mobile chassis 3 and second rollers G20, G21 of the fixed chassis 2 intended to cooperate at the bearing with said second rails R301, R311.

Such a double-rail construction has the function of holding heavy loads.

There are two first rails R20, R21, mainly constituted by two C-shaped profiles, respectively going along the side members 20 and 21 of the fixed chassis. The first rollers G301, G311, two of them, are bearings coming to be housed respectively in the rails and cooperating with the lower horizontal wings of the profiles, and in order to hold the vertical load.

These rollers can be respectively connected, in particular on one same plate, to ball bearings B301, B311 in a layered position, such that the omnidirectional ball of each ball bearing cooperates with the vertical wing of the profile, thus ensuring lateral guiding of the platform.

Likewise, there are two second rails R301, R311, mainly constituted by two C-shaped profiles, going along respectively the side members 30 and 31 of the first mobile chassis, in particular, on the exterior side. The first second rollers G20, G21, two of them, are bearings coming to be housed respectively in the rails and cooperating with the lower horizontal wings of the profiles, and in order to hold the vertical load. These rollers can be connected on one same plate to ball bearings B20, B21 in a layered position, such that the omnidirectional ball of each ball bearing cooperates with the vertical wing of the profile of the rail R301 or R311, thus ensuring lateral guiding of the platform.

According to an embodiment, the second sliding system between the first mobile chassis 3 and the second mobile chassis 4, comprises:

first rails R302, R312 of said first mobile chassis 3 and first rollers G40, G41 of said second mobile chassis 4 intended to cooperate at the bearing with said first rails R302, R312, second rails R40, R41 of second mobile chassis 4 and second rollers G302, G312 of said first mobile chassis 3 intended to cooperate at the bearing with said second rails R40, R41.

There again, such a double-rail construction has the function of holding heavy loads.

There are two first rails R302, R312, mainly constituted by two C-shaped profiles, respectively going along the side members 20 and 21 of the fixed chassis. The first rollers G40, G341, two of them, are bearings coming to be housed respectively in the rails and cooperating with the lower horizontal wings of the profiles, and in order to hold the vertical load.

These rollers can be respectively connected, in particular on one same plate, to ball bearings B40, B341 in a layered position, such that the omnidirectional ball of each ball bearing cooperates with the vertical wing of the profile, thus ensuring lateral guiding of the platform.

Likewise, there are two second rails R40, R41, mainly constituted by two C-shaped profiles of the second mobile chassis 4. The second rollers G302, G312, two of them, are bearings coming to be housed respectively in the rails and cooperating with the lower horizontal wings of the profiles, and in order to hold the vertical load. These rollers can each be connected on one same plate to ball bearings B302, B312 in a layered position, such that the omnidirectional ball of each ball bearing cooperates with the vertical wing of the profile of the rail R40 or R41, thus ensuring lateral guiding of the platform.

Advantageously, the first sliding system combined with the second sliding system oriented along the same direction can advantageously enable an unfolding of at least 80% of the length of the sliding platform 5 on the cantilever of said fixed chassis 2 in said (fully) unfolded position, for example, between 85% and 90%. According to the knowledge of the inventors, such an unfolding amplitude is higher than the performances of known platforms, which is limited to an unfolding of the sliding platform of around 60%.

According to an embodiment, the device can have, at the rear of the sliding platform 5, a protruding rail system 100, intended to ensure that objects present on the sliding platform 5 are held. This rail system 100 ensures that objects present on the sliding platform 5 are held, when an operator handles the unfolding platform, namely in the retracted position P1 from the sliding platform 5 to the unfolded position P2. This rail system extends substantially perpendicularly to the support area of the sliding platform 5.

Advantageously, this rail system can be of an adjusted length, along the width direction of the platform, comprising:
 a central part 101 and two lateral parts 102, 103, separate, respectively extending along the length of said central part 101 to these two ends,
 adjustment means, enabling to ensure the attachment of the lateral parts 102, 103 in different positions over the length of the central part 101.

For example, the central part 101 and the lateral parts 102, 103 are in the form of panels, substantially vertical, the adjustment means comprising oblong openings 104 oriented along the length of the panels and along the adjustment direction. These oblong openings 104 are intended to be crossed by attachment bodies, such as bolts.

The oblong openings 104 enable different positioning of the lateral parts 102, 103 on the central part 101, by being crossed by attachment bodies, such as bolts. Once the length of the adjusted rail system, attachment bodies such as bolts firmly ensure that the position is held. Such a rail system with an easily-adjustable length enables to adapt the length of the rail system to the vehicle's specifications.

The loading device preferably comprises a locking system for the sliding plate, at least in said retracted position and/or in said unfolded position from the sliding platform, even in an intermediary position.

Such a locking system comprises:
 a mobile body 110, connected to the second mobile chassis 4, protruding in the direction of the fixed chassis and a corresponding blocking body 120 connected to the fixed chassis 3, said locking body 110 being able to pass from a state of insertion wherein the mobile body 4 enters at least one opening O1, O2, O3 of the blocking body 120 to a retracted state, wherein the mobile body escapes said opening,
 a moving device 130, arranged at the level of the front edge of the sliding platform 5,
 a mechanical transmission 140, such as a rail or a cable, connecting said moving device to said mobile body and ensuring the passage of the locking body from the state of insertion to the retracted state at the time of an action on the moving device (push or traction).

Such a locking system is illustrated as a non-exhaustive example in FIG. 6.

The moving device 130 can comprise a pushbutton, arranged in particular on a handle firmly connected to the second mobile chassis 5. The blocking body 120 can comprise a profile oriented along the length of said fixed chassis 2, connected to the crossbars of the chassis, and having several blocking openings O1, O2, O3 for the mobile body 110, and in particular:
 a first opening O1 cooperating with the mobile body 110 in the retracted position P1 from the sliding platform 5,
 a second opening O2 cooperating with the mobile body 110 in the intermediary position from the sliding platform 5,
 a third opening O3 cooperating with the mobile body 110 in the unfolded position from the sliding platform 5.

Said mobile body 110 can be moved along the direction of the blocking body 120 under the stress of a spring, a manual action on the moving device 130, stressing the mobile body to the retracted state thereof.

According to the embodiment illustrated, the mobile body 110 is stressed by the spring in the direction of the blocking body 120, in order to lead to the automatic positional locking as soon as the mobile body is at the same level as an opening O1 to O3 of the body 120. The unlocking thus requires the action of the operator on the pushbutton of the moving body. This push is transmitted by the rail from the transmission 141 up to the mobile body 110. The end of this rail comprises a cam, cooperating with a cam follower of the mobile body 110. This cam follower transforms the push movement transmitted by the rail into a lifting movement of the mobile body against the restoring force of the spring, namely from the state of insertion thereof to the retracted state thereof.

The invention again relates to a method for producing a sliding platform loading device according to the invention, intended to equip a vehicle comprising a real loading area that has two protruding wheel passages.

This method comprises the following steps:

obtaining the dimensions of the rear area of the vehicle, sizing the auxiliary platforms 6 to 9 such that, in said retracted position from the sliding platform, the assembly of the area of the mobile platform 5 and the area of the auxiliary platforms 6 to 9 forms a flat, continuous area over the whole width of the rear area of said vehicle.

In particular, the contour of the auxiliary platforms 6 to 9 is adjusted to the dimensions of the rear area of the vehicle:

the two auxiliary platforms 6 and 7, located laterally on the same side of the device that has curved edges 62, 72, opposite, intended to mould the contour of the wheel passage onto this side, the two auxiliary platforms 8 and 9, located laterally on the other side of the device that has curved edges 82, 92, opposite, intended to mould the contour of the wheel passage onto this side.

The first step of obtaining the dimensions of the rear area of the vehicle can be obtained by the implementation of 3D digitalisation and acquisition equipment, in particular, a contactless scanner, and the acquisition of a cloud of point acquired during this acquisition step.

The use of CAD software then enables this digital file to be utilised to draw the contour and the sizing of the auxiliary platforms 6 to 9, in order to cover the whole of the rear area of the vehicle. This method enables to size the auxiliary platforms, advantageously without depending on data from vehicle manufacturers, and/or considering the uncertainties of sizing the rear area of the vehicle, inherent to production tolerances.

NOMENCLATURE

1. Loading device,
2. Fixed chassis,
20, 21. Side members (fixed chassis frame),
22, 23. Crossbars (fixed chassis frame),
24 to 26. Anchor irons,
27. Bores (Anchor irons),
R20, R21. First rails belonging to the first sliding system, respectively connected to the side members (20, 21),
G20, G21. Second rollers belonging to the first sliding system, respectively connected to the side members (20, 21),
3. First mobile chassis,
30, 31. Side members of the frame of the first mobile chassis,
32, 33. Crossbars of the frame of the first mobile chassis.
R.301, R311. Second rails belonging to the first sliding system, connected to the first mobile chassis.
G301, G311. First rollers belonging to the first sliding system, connected to the first mobile chassis.
R302, R312. First rails belonging to the second sliding system, connected to the first mobile chassis.
G302, G312. Second rollers belonging to the second sliding system, connected to the first mobile chassis.
4. Second mobile chassis,
R40, R41. Second rails belonging to the second rail system, connected to the second mobile chassis,
G40, G 41. First rollers belonging to the second rail system, connected to the second mobile chassis,
5. Sliding platform,
50. Plate,
51 to 54. Peripheral protective profiles, respectively lateral (left and right), front and rear,
55. Protective coating.
6 to 9. Auxiliary platforms (fixed),
60, 70, 80, 90. Plates (Auxiliary platforms),
61, 71, 81, 91. Protective profiles (plates),
62, 72, 82, 82. Curved edges (adjusted at the wheel passages),
100. Rail system,
101. Central part (Rail system),
102, 103. Lateral parts (Rail system),
104. Oblong openings (Means for adjusting the length of said rail system),
110. Mobile body of the locking system, connected to the second mobile chassis (Locking system),
120. Blocking body (Locking system),
130. Moving device (Locking system),
140. Mechanical transmission (rail).
10 to 15. Supports firmly connected the auxiliary platforms to the side members,
16. U-shaped section of the protective profiles,
17. Tubular section with slot of the protective profiles,
10
Ec1, Ec2. Lateral indentations for the wheel passages.
Ep. Size in thickness of the protective profile (FIG. 12).
O1, O2, O3. Opening of the blocking body defining three locking positions of the platform, respectively in the unfolded position, in the intermediary position, and in the retracted position.
P1. Retracted position from the sliding platform,
P2. Unfolded position from the sliding platform.

The invention claimed is:

1. A sliding platform loading device for equipping a rear area of a vehicle that has protruding wheel passages, the loading device comprising:

a fixed chassis configured to be anchored on the rear loading area of the vehicle, the fixed chassis comprising a frame formed by two side members and two crossbars connected by their ends;

a sliding platform comprising a flat area;

a guiding system between the sliding platform and said fixed chassis; and fixed auxiliary platforms, held by the fixed chassis, on a same level as the flat area of the sliding platform;

wherein:

said sliding platform is configured to pass from a retracted position on the fixed chassis, to an unfolded position on a cantilever of said fixed chassis, said auxiliary platforms define two lateral indentations configured to be of an additional form to said wheel passages, in said retracted position from the sliding platform, the auxiliary platforms laterally extend the flat area of the sliding platform, and supports extend laterally from the side members to the exterior of the frame, in order to hold the auxiliary platforms on the cantilevers to the side members, wherein, each support connecting one of the side members to the corresponding auxiliary platform comprises a bracket formed by two tubular profiles, perpendicular, put end-to-end by their end, said bracket having at one of the free ends thereof, a plate attached to the lateral area of a side member, and at the free end thereof, a plate attached to the underside of the auxiliary platform.

2. Device according to claim 1, wherein the fixed chassis has several anchor irons spread out over the top of the frame, each one of the anchor irons connecting the two side members along a direction by means in relation to the crossbars, not perpendicular to the side members.

3. Device according to claim 2, wherein each one of the anchor irons comprises a plurality of bores spread out over the length of the iron, said bores being intended for the adjustment of the position of attachment bodies ensuring the attachment of said fixed chassis to the vehicle.

4. Device according to claim 1, wherein the sliding platform comprises a plate, as well as the peripheral protective profiles, bordering the plate at least along the lateral edges thereof, even the rear edge thereof and the front edge thereof.

5. Device according to claim 4, wherein the auxiliary platforms each comprise a plate, as well as a protective profile, bordering the interior edge of said plate intended to be in the immediate proximity of the sliding platform in said retracted position.

6. Device according to claim 1, wherein the first sliding system between the fixed chassis and the first mobile chassis, comprises:
   first rails of said fixed chassis and the first rollers of said first mobile chassis intended to cooperate at the bearing with said first rails,
   second rails of the first mobile chassis and the second rollers of the fixed chassis intended to cooperate at the bearing with said second rails.

7. Device according to claim 1, having at the rear of the sliding platform, a protruding rail system intended to ensure that objects present on the sliding platform are held.

8. Device according to claim 1, having an unfolding of at least 80% of the length of the sliding platform on the cantilever of said fixed chassis in said unfolded position.

9. A sliding platform loading device for equipping a rear area of a vehicle that has protruding wheel passages, the loading device comprising:
   a fixed chassis configured to be anchored on the rear loading area of the vehicle;
   a sliding platform comprising a flat area;
   a guiding system between the sliding platform and said fixed chassis; and
   fixed auxiliary platforms, held by the fixed chassis, on a same level as the flat area of the sliding platform;
   wherein:
   said sliding platform is configured to pass from a retracted position on the fixed chassis, to an unfolded position on a cantilever of said fixed chassis,
   said auxiliary platforms define two lateral indentations configured to be of an additional form to said wheel passages, and
   in said retracted position from the sliding platform, the auxiliary platforms laterally extend the flat area of the sliding platform,
   wherein the sliding platform comprises a plate and peripheral protective profiles bordering the plate at least along the lateral edges thereof, even the rear edge thereof and the front edge thereof,
   wherein the auxiliary platforms each comprise a plate, as well as a protective profile, bordering the interior edge of said plate configured to be in the immediate proximity of the sliding platform in said retracted position, and
   wherein at least part of the protective profile of the auxiliary platform and/or each protective profile of the sliding platform comprises a U-shaped section, receiving the edge of the plate at an interlocking unit, extended by a tubular section, in the function of a hanging groove, of the same thickness, having a higher, longitudinal slot leading from the upper wall of the tubular section, forming the groove inlet.

10. A sliding platform loading device for equipping a rear area of a vehicle that has protruding wheel passages, the loading device comprising:
    a fixed chassis configured to be anchored on the rear loading area of the vehicle;
    a sliding platform comprising a flat area;
    a guiding system between the sliding platform and said fixed chassis; and
    fixed auxiliary platforms, held by the fixed chassis, on a same level as the flat area of the sliding platform;
    wherein:
    said sliding platform is configured to pass from a retracted position on the fixed chassis, to an unfolded position on a cantilever of said fixed chassis,
    said auxiliary platforms define two lateral indentations configured to be of an additional form to said wheel passages, and
    in said retracted position from the sliding platform, the auxiliary platforms laterally extend the flat area of the sliding platform,
    wherein the sliding platform comprises a plate and peripheral protective profiles bordering the plate at least along the lateral edges thereof, even the rear edge thereof and the front edge thereof,
    wherein the upper area of the edge of the plate is machined with a thickness corresponding to a thickness of an upper wing of the profile covering the upper area of the plate, and wherein said machined part of the plate receives the upper wing of the protective profile at an interlocking unit, said upper area of the protective profile being flush with the non-machined upper area of said plate adjoining said protective profile.

11. A sliding platform loading device for equipping a rear area of a vehicle that has protruding wheel passages, the loading device comprising:
    a fixed chassis configured to be anchored on the rear loading area of the vehicle;
    a sliding platform comprising a flat area;
    a guiding system between the sliding platform and said fixed chassis; and
    fixed auxiliary platforms, held by the fixed chassis, on a same level as the flat area of the sliding platform;
    wherein:
    said sliding platform is configured to pass from a retracted position on the fixed chassis, to an unfolded position on a cantilever of said fixed chassis,
    said auxiliary platforms define two lateral indentations configured to be of an additional form to said wheel passages, and
    in said retracted position from the sliding platform, the auxiliary platforms laterally extend the flat area of the sliding platform,
    wherein said guiding system between the sliding platform and said fixed chassis comprises:
    a first mobile chassis, sliding in relation to the fixed chassis by an intermediary of a first sliding system between the fixed chassis and the first mobile chassis,
    a second mobile chassis, sliding in relation to the first mobile chassis by the intermediary of a second sliding system between the fixed chassis and the second mobile chassis, and
    wherein said sliding platform is firmly connected to the second mobile chassis,
    wherein the first sliding system between the fixed chassis and the first mobile chassis, comprises:

first rails of said fixed chassis and first rollers of said first mobile chassis configured to cooperate at a bearing with said first rails,
second rails of the first mobile chassis and the second rollers of the fixed chassis configured to cooperate at a bearing with said second rails,
wherein the second sliding system between the first mobile chassis and the second mobile chassis, comprises:
first rails of said first mobile chassis and first rollers of said second mobile chassis intended to cooperate at the bearing with said first rails,
second rails of the second mobile chassis and the second rollers of said first mobile chassis intended to cooperate at the bearing with said second rails.

12. Device according to claim 11, wherein the first sliding system and/or said second sliding system has:
rollers, in particular, said first rollers and second rollers, at the horizontal rotating axis, intended to hold the load, intended to each cooperate at the bearing with a horizontal wing of a rail,
ball bearing systems oriented so as to each cooperate at the bearing with a vertical wing of a rail, in order to ensure lateral guiding.

13. A sliding platform loading device for equipping a rear area of a vehicle that has protruding wheel passages, the loading device comprising:
a fixed chassis configured to be anchored on the rear loading area of the vehicle;
a sliding platform comprising a flat area;
a guiding system between the sliding platform and said fixed chassis; and
fixed auxiliary platforms, held by the fixed chassis, on a same level as the flat area of the sliding platform;
wherein:
said sliding platform is configured to pass from a retracted position on the fixed chassis, to an unfolded position on a cantilever of said fixed chassis,
said auxiliary platforms define two lateral indentations configured to be of an additional form to said wheel passages, and
in said retracted position from the sliding platform, the auxiliary platforms laterally extend the flat area of the sliding platform,
said sliding platform loading device further comprising at the rear of the sliding platform, a protruding rail system configured to ensure that objects present on the sliding platform are held,
wherein said rail system is of an adjusted length along the width direction of the platform, comprising:
a central part and two lateral parts, separate, respectively extending along the length of said central part to the two ends,
adjustment means, enabling to ensure the attachment of the lateral parts in different positions over the length of the central part.

14. Device according to claim 13, wherein the central part and the lateral parts are in the form of vertical panels, the adjustment means comprising oblong openings oriented along the length of the panels and along the adjustment direction, intended to be crossed by attachment bodies such as bolts.

15. A sliding platform loading device for equipping a rear area of a vehicle that has protruding wheel passages, the loading device comprising:
a fixed chassis configured to be anchored on the rear loading area of the vehicle;
a sliding platform comprising a flat area;
a guiding system between the sliding platform and said fixed chassis; and
fixed auxiliary platforms, held by the fixed chassis, on a same level as the flat area of the sliding platform;
wherein:
said sliding platform is configured to pass from a retracted position on the fixed chassis, to an unfolded position on a cantilever of said fixed chassis,
said auxiliary platforms define two lateral indentations configured to be of an additional form to said wheel passages, and
in said retracted position from the sliding platform, the auxiliary platforms laterally extend the flat area of the sliding platform,
wherein said guiding system between the sliding platform and said fixed chassis comprises:
a first mobile chassis, sliding in relation to the fixed chassis by an intermediary of a first sliding system between the fixed chassis and the first mobile chassis,
a second mobile chassis, sliding in relation to the first mobile chassis by an intermediary of a second sliding system between the fixed chassis and the second mobile chassis, and
wherein said sliding platform is firmly connected to the second mobile chassis,
said loading device further comprising a sliding plate locking system at least in said retracted position and/or in said unfolded position from the sliding platform, even in an intermediary position, comprising:
a mobile body, connected to the second mobile chassis, protruding in the direction of the fixed chassis and a corresponding blocking body, connected to the fixed chassis, said locking body being able to pass from a state of insertion, wherein the body enters at least one opening of the blocking body, to a retracted state, wherein the mobile body escapes said opening,
a moving device, arranged at the level of the front edge of the sliding platform,
a mechanical transmission, such as a rail, connecting said moving device to said mobile body and ensuring the passage of the locking body in a state of insertion, to the retracted state, at the time of an action on the moving device.

16. Device according to claim 15, wherein the moving device comprises a pushbutton, arranged on a handle firmly connected to the second mobile chassis.

17. Device according to claim 15, wherein:
the blocking body comprises a profile oriented along the length of said fixed chassis and having several blocking openings for the mobile body,
said mobile body can be moved along the direction of the blocking body under the stress of a spring, a manual action on the moving device, stressing the mobile body to the retracted state thereof.

18. Automotive vehicle comprising a rear loading area that have two protruding wheel passages, said rear area of the vehicle being equipped with a sliding platform loading device according to claim 1, of which the lateral indentations receive said wheel passages at the interlocking unit, and such that in said retracted position from the sliding platform, the loading device forms a flat area over the whole of the width of the rear area of said vehicle.

19. Method for producing a sliding platform loading device according to claim 1, intended to equip a vehicle comprising a rear loading area that has two protruding wheel passages, said method having the following steps:

obtaining dimensions of the rear area of the vehicle,
sizing the auxiliary platforms such that, in said retracted position from the sliding platform, the assembly of the area of the mobile platform and the area of the auxiliary platforms forms a flat, continuous area over the whole width of the rear area of said vehicle.

* * * * *